Sept. 1, 1964

H. F. BROSE 3,146,635

ROTOR BALANCING SLEEVE

Filed May 22, 1961

INVENTOR
HARLAN F. BROSE
BY *Norman Friedland*
AGENT

United States Patent Office 3,146,635
Patented Sept. 1, 1964

3,146,635
ROTOR BALANCING SLEEVE
Harlan F. Brose, Longmeadow, Mass., assignor to United Aircraft Corporation, East Hartford, Conn., a corporation of Delaware
Filed May 22, 1961, Ser. No. 111,609
7 Claims. (Cl. 74—573)

This invention relates to rotary machinery and particularly to means for eliminating unbalance of the rotating members.

Unbalance of a rotor in a rotating machine generally stems from looseness between the rotor bore and its cooperating shaft. This problem is primarily due to three distinct reasons which are, namely (1) the bore growth which is occasioned by the rotor stress occurring at various speeds, (2) the temperature differential which generally exists between the outer periphery of the rotor and the cooperating shaft, and (3) the looseness between the shaft and the bore which is necessary for assembling requirements. While it is possible to achieve the dynamic balance by making the shaft integral with the rotor, for many applications such an assembly is not possible, while in others the assembly and disassembly is cumbersome.

The dynamic unbalance becomes a particular problem where mass and speed of the rotating members are relatively high values. For example, I have found that a rotor weighing six pounds and rotating at a speed of 50,000 r.p.m. could create unbalance force of approximately fourty-two pounds if the rotor were allowed to shift $1/10,000$ of an inch from the balanced center line. In such a situation, if multiplied by some realistic looseness for temperature, stress, and assembly looseness, say .0006 inch, .0008 inch, and .0005 inch, respectively, for a .75 inch diameter shaft, an unbalance of 800 pounds is realized if during operation of the machine all loosenesses were on one side of the shaft. Loads of these magnitudes, particularly in aircraft application, could not be tolerated. The life of the machinery would obviously be severely curtailed.

It is therefore an object of this invention to obviate the problems mentioned in the above by providing a landed sleeve between the bore of the rotor and its cooperating shaft.

It is a further object of this invention to provide a sleeve of the type described which has sufficient interference fit between the outer diameter of the sleeve and the bore and between the shaft and the inner diameter of the sleeve.

It is still a further object of this invention to provide a sleeve for a rotating machine that includes outer and inner lands axially spaced along the axis of rotation which are specifically spaced from each other so that the compressing and stretching of any one land does not effect any other adjacent land.

Other features and advantages will be apparent from the specification and claims and from the accompanying drawings which illustrate an embodiment of the invention.

Figure 1:
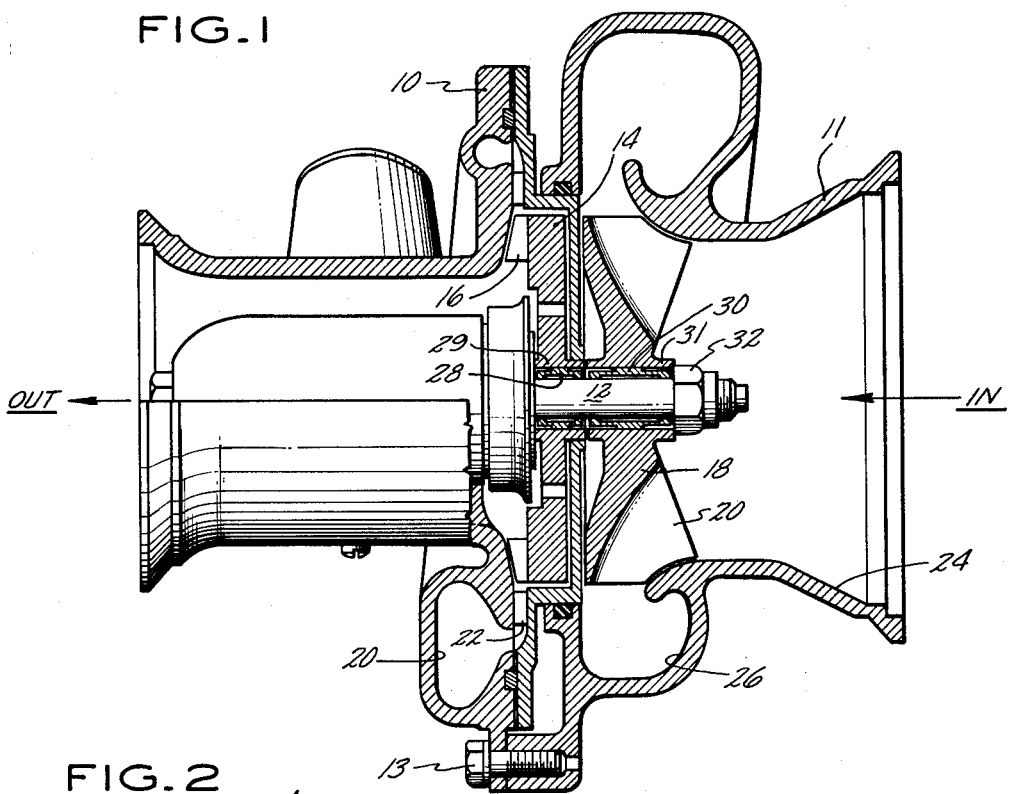
FIG. 1 is an elevated view partly in full and partly sectional illustrating this invention.

FIG. 1 illustrates a turbo-compressor unit which may be used for cooling air for an air-cycle cooling system and is of the type described in U.S. application Serial No. 478,433, filed December 29, 1954, entitled "Combined Fan and Turbine," and assigned to the same assignee. While this is an application where my invention may be utilized, it is merely shown for illustrative purposes and is by no means intended to be limited therefor. As one skilled in the art will realize, dynamic unbalance is a problem generally attendant rotative machinery.

The turbo-compressor unit comprises casing 10 which surrounds and supports the bearing (not shown), which in turn supports the shaft 12 which extends axially beyond the bearing. Casing 11 surrounding the turbine rotor and compressor rotor is secured to casing 10 by bolt 13. A turbine rotor carrying a plurality of blades 16 is mounted to the shaft 12 inwardly of the compressor rotor 18 which is also mounted on the shaft. The compressor rotor carries along its circumference a plurality of compressor blades 20. Thus, the general operation of the unit consists of supplying a motivating fluid in the volute 20 which is directed to the turbine blades 16 by the nozzle 22. The fluid impinging on the turbine blades causes rotation of the turbine rotor and the fluid is discharged rearwardly. A fluid is provided through entrance 24 which impinges on the buckets 20 for loading the compressor and in turn is discharged through the volute 26. For more details reference is hereby made to the above-referred-to patent application.

A pair of sleeves 28 and 30 are provided between the hubs 29 and 31 of the turbine and compressor rotor, respectively, and the outer end of the shaft 12. The sleeves 28 and 30 are shrink-fitted to the rotor and press-fitted to the shaft 12, as will be more fully explained hereinbelow, so that the shaft 12 rotates with the turbine rotor and the compressor rotor. A nut 32 may be fastened to the end of the shaft, as shown in the drawing.

Figure 2:
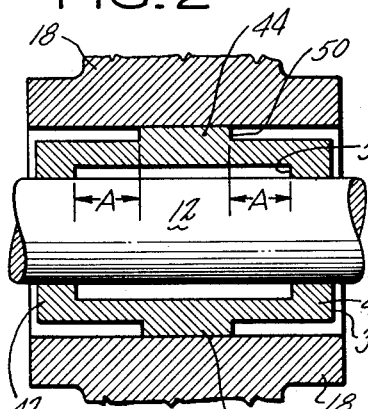
FIG. 2 is an expanded partial view illustrating the sleeve.

I have found that properly spaced lands along a relatively thin tubular member formed into a sleeve between the shaft and rotor substantially eliminates dynamic unbalance. The sleeve is provided with inner and outer lands wherein the inner lands press against the shaft and the outer lands press against the wall of the bore of the rotor. The sleeve 30 shown enlarged in FIG. 2 and referred to hereinafter for explanation purposes, may be formed from a suitable resilient material, such as steel, and comprises the inner lands 40 and 42 axially spaced along the axis of rotation and the outer land 44 which is disposed between the two inner lands. In accordance with the present invention, the sleeve is shrink-fitted into the bore so that despite the bore growth due to rotor stress and temperature differential between the rotor and the adjacent portion of the shaft said rotor will always be supported by the sleeve throughout the complete operating range of the rotating unit. Thus, the sleeve will always press against the bore with sufficient compression force regardless of the speed and/or temperatures which the machine is subjected to.

The problem of assuring that there is no looseness between the bore and the shaft during assembly is obviated since the sleeve is sufficiently thin and since the hub does not have to stretch. Thus, the sleeve being relatively thin with respect to the rotor will have sufficient stretch to slide on to the shaft by pressing the rotor and sleeve subassembly in any suitable manner. An example of the proper interference fit between the shaft and the sleeve is between .0000 to .0005 inch and the interference fit between the bore and the outer land is between .0015 and .0020 inch for a shaft diameter of approximately .75 inch. Thus, it becomes apparent as the speed of the rotor increases, the outer surface of the lands 42 and 40 tend to tighten against the shaft as the bore grows, while the outer surface of land 44 will follow the bore growth due to shrink fit. In this manner, the center of gravity remains in the same position which is coincidental to the rotating center line.

While it is possible to provide a standard bushing or sleeve to mate with the shaft and rotor at the above-mentioned interference fit, assembly with these dimensional requirements is extremely difficult and in some cases impossible. Further, due to the growth of the bore attendant normal operations, the bushing or sleeve unites together with the rotor so as to bind into an integral unit. Disassembly of the unit in this situation is practically, if not, impossible without incurring injury to the shaft.

Figure 3:
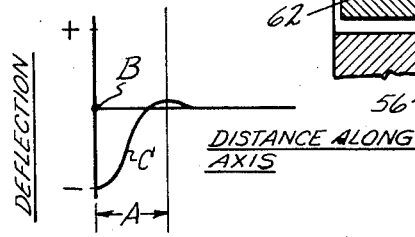
FIG. 3 is a graphic illustration depicting the deflecting curve of the sleeve.

To assure that the compressing and stretching of a land does not affect the adjacent land, in accordance with this present invention the distances between lands are predetermined by the method described hereinbelow. Referring to FIG. 3, which graphically illustrates a well-known deflection curve C of the sleeve 30, wherein the distances along the axis of the sleeve is plotted against the deflection of the sleeve, point B represents the edge 50 and is used as the starting point and the distance is taken along the axis from left to right. It will be noted that for best results edge 50 of land 44 and edge 52 of land 40 are so spaced that the distance therebetween falls between the most negative and most positive points on the curve which could be considered to be equivalent to a ½ wave length. This constitutes the preferred distance, however, it is contemplated within the scope of this invention that a longer distance could be used between the lands. The other lands are spaced accordingly.

Figure 4:
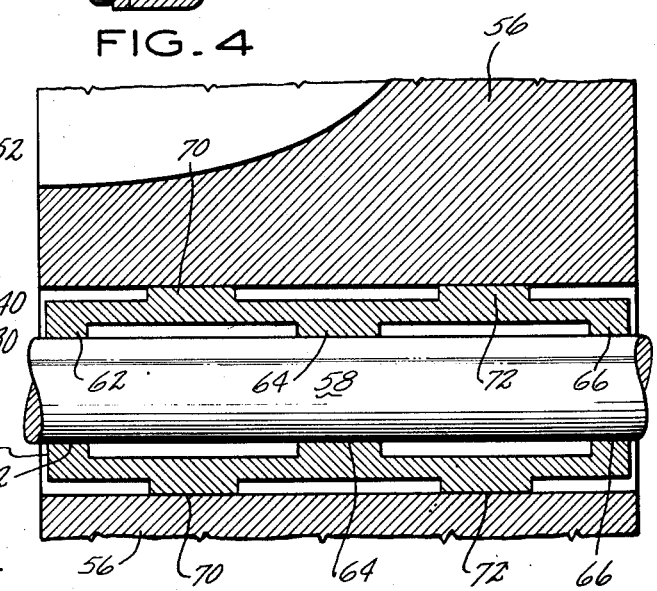
FIG. 4 is a partial view in sectional showing a modified version of the sleeve.

FIG. 4 is a modification of the present invention showing the sleeve 60 mounted between rotor 56 and shaft 58. Here it will be noted, the inner lands 62, 64, and 66 are adjacent to shaft 58 while lands 70 and 72 in alternate relationship are adjacent the bore of the rotor. The critical dimension is the distance between the lands so that they will geometrically coincide with the deflection curve as was noted hereinabove. Additional lands may be provided in long bore rotors. Thus, it will be obvious to one skilled in the art that the length of bore will determine the required number of lands. While all the drawings show that the lands adjacent the shaft are on the outer ends of the sleeve, these lands may be reversed so that the lands adjacent the rotor may be on the other ends of the sleeve.

In assembling the sleeve to the bore of the rotor, the rotor is heated, while the sleeve is cooled in any suitable manner. Cooling of the sleeve may be done by dispersing the sleeve into a liquid nitrogen bath. The amount of cooling of the sleeve and heating of the rotor, that is the differential temperature between both members, is predetermined by first ascertaining the maximum growth of the bore which will occur throughout the complete range of operation of the rotating machine. This is accomplished by ascertaining the temperature differential between the shaft and the rotor and the stresses to be encountered, and calculating the bore growth in a manner well known in the art. Once the potential bore growth is ascertained then, in a manner well known in the art, it is possible to predetermine the degree of shrink-fitting necessary to compensate for the growth. That is to say, for proper compensation, the sleeve will contact the bore of the rotor throughout the complete operating range. After assembling the sleeve to the bore of the rotor, this subassembly may then be finished by grinding the inner diameter of the sleeve to its proper dimension. The sleeve and rotor subassembly may then be press-fitted on the shaft. This assembly operation may occur anywhere along the assembly procedure of the entire rotating machine.

What has been illustrated is a sleeve member characterized as being simple in construction, economical to build, and yet affords rugged use. The sleeve supports a rotor to a shaft and compensates for any shifting of the center line which may be occasioned if radial looseness between the rotor and the shaft were allowed to exist.

It is to be understood that the invention is not limited to the specific embodiment herein illustrated and described, but may be used in other ways without departing from its spirit as defined by the following claims.

I claim:

1. A rotor, a shaft rotatably supporting said rotor, means for eliminating unbalance in said rotor comprising a deflection sleeve having a plurality of spaced lands extending along the axis of rotation and disposed between said rotor and said shaft, said sleeve having a particular deflection characteristic, the spacing of each of said lands governed by said particular deflection characteristics.

2. A rotor, a shaft rotatable supporting said rotor, means for eliminating dynamic unbalance of said rotor comprising a deflection sleeve press-fitted on said shaft and shrink-fitted on said rotor, a first land carried on the outer surface of said sleeve adjacent said rotor, a pair of lands carried on the inner surface of said sleeve adjacent said shaft, said lands extending along said axis and spaced in alternate relation wherein the land on the inner surface is adjacent the land on the outer surface, the distance between one of the inner lands and the adjacent outer land being substantially equal to the distance between the point of negative deflection of the sleeve and the point of positive deflection of the sleeve.

3. A sleeve as defined in claim 2 wherein the distance between the other of said pair of lands and the first land is substantially equal to the distance between said one land of said pair of inner lands and said adjacent outer land.

4. The method of eliminating unbalance of a rotary member comprising the steps of recessing the inner and outer surface of an elongated relatively thin deflectable tubular member forming the lands that radially protrude on the inner and outer surface thereof, locating the lands so that alternate lands are disposed so that one of said alternate lands falls on the point of negative deflection and the other land falls on the point of positive deflection, shrink-fitting the tubular member to the central bore of the rotary member, the step of shrink-fitting comprising heating the rotary member to a predetermined temperature, cooling the tubular member to a predetermined temperature, the temperature of heating and cooling being ascertainable by calculating the potential growth of the bore resulting from intended operation of said rotary member, inserting said tubular member into the bore of the rotary member, press-fitting the assembled rotary member to a shaft.

5. The method as described in claim 4 including the step of increasing the inner diameter of the assembled rotary member just prior to the step of press fitting.

6. A rotor, a shaft supporting said rotor, means for eliminating unbalance of said rotor comprising a flexible sleeve having a plurality of spaced lands extending along the axis of rotation of said shaft and disposed between said rotor and said shaft, said lands alternately spaced so that one of said lands projects outwardly of the axis of rotation and an adjacent one of said lands projects inwardly of the axis of rotation, said sleeve having a particular deflection characteristic, the spacing of each of said lands governed by said particular deflection characteristic such that one of said lands is located at a point of negative deflection of said sleeve and the adjacent land being located at a point of positive deflection of said sleeve.

7. A rotor, a shaft supporting said rotor, means for eliminating unbalance of said rotor comprising a deflection sleeve having a plurality of spaced lands extending along the axis of rotation and disposed between said rotor and said shaft, said lands alternately spaced so that one of said lands projects outwardly of the axis of rotation and adjacent one of said lands projects inwardly of the axis of rotation, each of said lands having a forward edge and a rearward edge, said sleeve having a particular deflection characteristic, the spacing of each of said lands governed by said particular deflection characteristic such that the rearward edge of one of said lands being located at a point of negative deflection of said sleeve and the forward edge of the adjacent land being located at a point of positive deflection of said sleeve.

References Cited in the file of this patent

UNITED STATES PATENTS

| | | |
|---|---|---|
| 553,811 | Laval | Jan. 28, 1896 |
| 1,318,302 | Sperry | Oct. 7, 1919 |
| 2,361,741 | Bousky | Oct. 31, 1944 |
| 2,751,255 | Schroeder | June 19, 1956 |

FOREIGN PATENTS

| | | |
|---|---|---|
| 330,305 | Germany | Dec. 13, 1920 |